United States Patent [19]

Shimazaki et al.

[11] Patent Number: 5,293,277
[45] Date of Patent: Mar. 8, 1994

[54] DIGITAL SIGNAL MAGNETIC RECORDING APPARATUS WITH TIME-DIVISION MULTIPLEX SIGNAL TRANSMISSION TO A ROTARY CYLINDER

[75] Inventors: Hiroaki Shimazaki, Hirakata; Masamitsu Ohtsu, Moriguchi, both of Japan

[73] Assignee: Matsushita Electric Industrial Co., Ltd., Osaka, Japan

[21] Appl. No.: 791,536

[22] Filed: Nov. 14, 1991

[30] Foreign Application Priority Data

Nov. 21, 1990 [JP] Japan .................. 2-319015

[51] Int. Cl.⁵ .............................. G11B 15/14
[52] U.S. Cl. .............................. 360/64; 360/32; 360/108
[58] Field of Search ............ 360/18, 19.1, 20, 21, 360/61, 64, 108, 32, 23, 31; 358/343

[56] References Cited

U.S. PATENT DOCUMENTS 5,081,547  1/1992  Howell .................... 360/31

FOREIGN PATENT DOCUMENTS 0163204  8/1985  Japan .
2160059  12/1985  United Kingdom .

OTHER PUBLICATIONS

"High Data Rate Recording for HDTV Digital VTR", IEEE Transactions On Magnetics, vol. 24, No. 6, Nov. 1988, M. Umemoto et al., pp. 2407-2409.

Primary Examiner—Andrew L. Sniezek
Attorney, Agent, or Firm—Wenderoth, Lind & Ponack

[57] ABSTRACT

In a digital signal magnetic recording/reproducing apparatus, input digital signals of plural channels and a recording current control signal expressing recording current values corresponding to the respective digital signals are time-division mulitplexed and transmitted into a rotary cylinder, and the digital signals and recording current control signal are separated by a circuit built in the rotary cylinder. The recording current for each of the digital signals is controlled depending on the recording current control signal. By time-division multiplexing the input digital signals of plural channels and transmitting the multiplexed signal into the rotary cylinder, the number of channels of the rotary transformer can be reduced. Further, by transmitting the recording current control signal into the rotary cylinder, the recording current of the digitally transmitted signal can be adjusted.

3 Claims, 6 Drawing Sheets

DIRECTION OF SCANNING

41 AUDIO TRACK  42 VIDEO TRACK

GUARD

DIGITAL SIGNAL MAGNETIC RECORDING APPARATUS WITH TIME-DIVISION MULTIPLEX SIGNAL TRANSMISSION TO A ROTARY CYLINDER

BACKGROUND OF THE INVENTION

1. Field of the Invention

The present invention relates to a digital magnetic recording/reproducing apparatus such as a digital video tape recorder (DVTR).

2. Description of the Prior Art

As higher definition is demanded for video signals, the data rate of recording and reproducing signals tends to be higher in the digital signal magnetic recording and reproducing apparatus. For raising the data rate of recording and reproducing signals, together with the increase of data rate per channel, it is being studied to lower the data rate per channel by increasing the number of channels and dividing the input signals, which is known as multi-channel design.

In the conventional digital signal magnetic recording/reproducing apparatus, when recording multi-channel signals by using a plurality of magnetic heads mounted on a rotary cylinder, signals of individual channels are transmitted into the rotary cylinder through a rotary transformer independently. Further, the recording current is adjusted by once adjusting the signal level in the circuit outside the rotary cylinder, and transmitting into the rotary cylinder (for instance, M. Umemoto, Y. Eto, H. Sawamura and H. Katayama, "High data rate recording for HDTV digital VTR," IEEE, Transactions on Magnetics, Vol. 24, No. 6, p. 2407, 1988).

However, in the constitution for transmitting the signals of individual channels into the rotary cylinder through a rotary transformer independently, as many channels of the rotary transformer are required as the number of channels of recording signals. As the number of the channels of rotary transformer increases, the size of the rotary transformer becomes larger, and the loads on the motor and its control circuit for driving the rotary cylinder increase. If attempted, to the contrary, to reduce the size of the rotary transformer, the crosstalk between channels increases, and the signal deteriorates.

SUMMARY OF THE INVENTION

It is hence a primary object of the invention to present a digital signal magnetic recording/reproducing apparatus having a reduced number of channels of the rotary transformer, by transmitting a digital transmission signal in which input digital signals of plural channels are time-division multiplexed into a rotary cylinder.

It is a further object of the invention to present a digital signal magnetic recording/reproducing apparatus possessing means for adjusting the recording current of digitally transmitted signals, or realizing a means for adjusting the recording current without increasing the number of channels of the rotary transformer.

To achieve the above objects, the invention presents a digital signal magnetic recording/reproducing apparatus which comprises a multiplex circuit for time-division multiplexing input digital signals of plural channels to obtain a digital transmission signal, a first channel for transmitting the digital transmission signal into a rotary cylinder, a demultiplex circuit installed in the rotary cylinder for obtaining the digital signal of plural channels from the digital transmission signal transmitted through the first channel, and a plurality of magnetic heads for recording the digital signals of plural channels which are outputs of the demultiplex circuit individually on a magnetic recording medium.

The apparatus may further comprise a second channel for receiving and transmitting into the rotary cylinder a recording current control signal expressing a value of recording current for recording each of the digital signals of plural channels on the magnetic recording medium, and a plurality of recording current control circuits for controlling quantities of recording currents of the digital signals of plural channels which are outputs of the demultiplex circuit according to the recording current control signal transmitted through the second channel, and feeding the recording currents into the plurality of magnetic heads.

In the invention, the multiplex circuit may multiplex the digital signals of plural channels and the recording current control signal by time-division multiplexing to obtain a digital transmission signal, and the demultiplex circuit may obtain the digital signals of plural channels and the recording current control signal from such a digital transmission signal. In this case, a plurality of recording current control circuits may control the recording currents of the digital signals of plural channels according to the recording current control signal from the demultiplex circuit.

Also, inserts a no-signal portion may be inserted in a part of the input digital signals of plural channels. In this case, the multiplex circuit may time-division multiplex the recording current control signal in the no-signal portion.

Preferably, the no-signal portion is inserted together with an allowance for an error of a head changeover timing, that is a timing of changing over the head to be used when recording signals of one channel among plural magnetic heads.

Furthermore, when a digital video signal and a digital audio signal are time-division multiplexed, a no-signal portion may be inserted therebetween as an allowance for editing of picture only or sound only.

In the above constitution, by transmitting the digital transmission signal having the input digital signals of plural channels time-division multiplexed into the rotary cylinder, the number of channels in the rotary transformer can be reduced.

Further, by transmitting the recording current control signal into the rotary cylinder, the recording currents of the digitally transmitted signals can be adjusted.

In addition, by time-division multiplexing the recording current control signal with the digital transmission signal the recording currents of the digitally transmitted signals can be adjusted without increasing the number of channels of the rotary transformer.

Moreover, by transmitting the recording current control signal digitally by time-division multiplexing, in the nosignal portion provided as a switching allowance for changing over the heads to be used when recording the signals in each channel, or as an allowance for editing between multiplexed video signal and audio signal, the recording currents of the digitally transmitted signals can be adjusted in a small hardware scale without unnecessarily expanding the band of the digital transmission signal.

DESCRIPTION OF THE PREFERRED EMBODIMENTS

Figure 1:
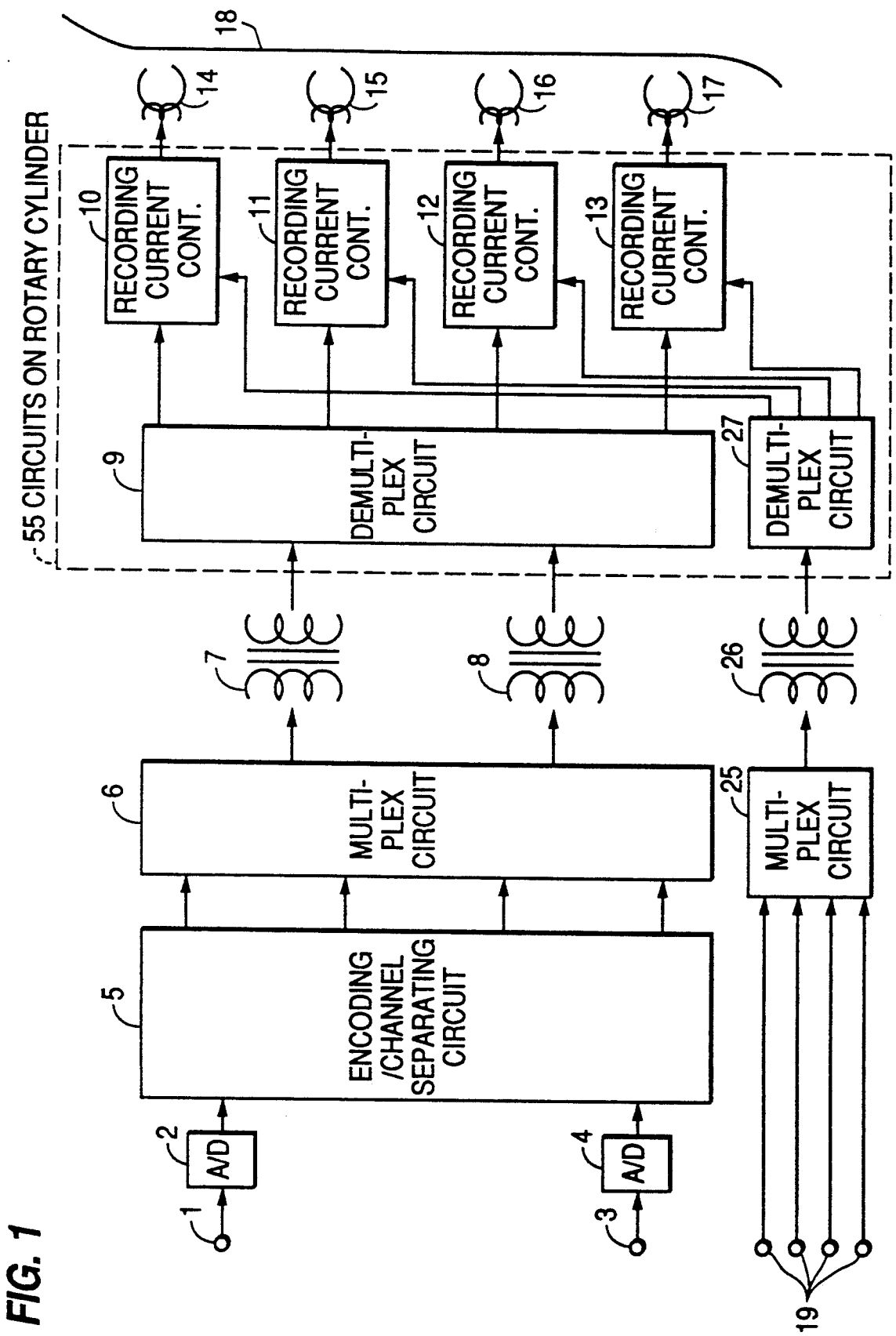
FIG. 1 is a block diagram of a digital signal magnetic recording/reproducing apparatus in a first embodiment of the invention.

FIG. 1 is a block diagram of a digital signal magnetic recording/reproducing apparatus in a first embodiment of the invention. An analog television signal is fed to an input terminal 1, and an analog audio signal to an input terminal 3. The input analog television signal and analog audio signal are respectively converted into a digital television signal and a digital audio signal in analog/digital converters (A/D converter) 2 and 4. The digital television signal and digital audio signal are fed into an encoding/channel separating circuit 5. The digital signals entering the encoding/channel separating circuit 5 are converted into digital recording signals of plural channels, and are fed into a multiplex circuit 6.

The digital recording signals of plural channels entering the multiplex circuit 6 are time-division multiplexed and are transmitted into a demultiplex circuit 9 in a rotary cylinder through a rotary transformer 7 as digital transmission signals. In this embodiment, meanwhile, the multiplex circuit 6 transmits the transmission clock to be used when generating the original digital recording signals of plural channels from the digital transmission signals into the demultiplex circuit 9 in the rotary cylinder through a rotary transformer 8.

Figure 2A:
FIG. 2(a) to (g) are diagrams showing examples of waveforms of a digital recording signal, digital transmission signal and transmission clock in the digital signal magnetic recording/reproducing apparatus shown in FIG. 1.
Figure 2B:
Figure 2C:
Figure 2D:
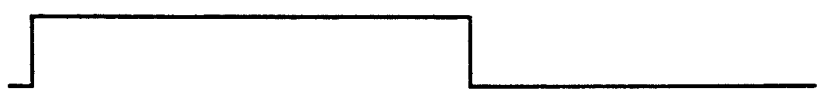
Figure 2E:
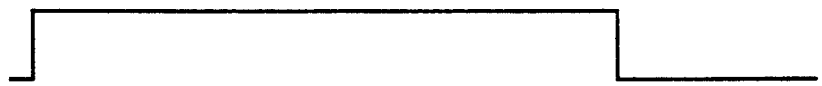
Figure 2F:
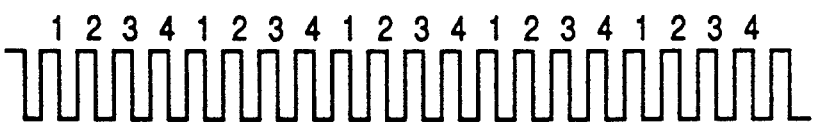
Figure 2G:
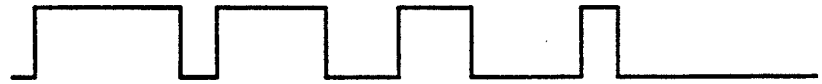

FIG. 2(a) through (g) show examples of waveforms of digital transmission signals and the transmission clock. FIG. 2(a) is the clock for processing the digital recording signals of plural channels entered form the encoding/channel separating circuit 5 into the multiplex circuit 6. In synchronism with this clock, for example, digital recording signals of four channels shown in FIG. 2(b), (c), (d), (e) are fed into the multiplex circuit 6. The digital recording signals of these four channels are time-division multiplexed in synchronism with the transmission clock as shown in FIG. 2(f), so that they may be converted, for example, into a digital transmission signal as shown in FIG. 2(g).

FIG. 2(g) shows the mode of multiplexing the digital recording signals of four channels shown in FIG. 2(b), (c), (d) and (e) on the digital transmission signal of one channel, by converting in synchronism with the transmission clock shown in FIG. 2(f) so as to take the same level as the signal level of FIG. 2(b) at the timing indicated by numeral 1 in the diagram, and similarly to take the same level as the signal levels in FIG. 2(c), (d), (e) respectively at the timings indicated by 2, 3, 4. In the demultiplex circuit 9, in the reverse procedure of the above, the digital transmission signal shown in FIG. 2(g) is separated into digital recording signals of four channels shown in FIG. 2(b), (c), (d) and (e).

In the demultiplex circuit 9, in the inverse order to the above, the digital recording signals of four channels shown in FIG. 2(b), (c), (d) and (e) can be demultiplexed from the digital transmission signals shown in FIG. 2(g).

Back to FIG. 1, in this embodiment, a recording current control circuit expressing the recording current value when recording the digital recording signals of plural channels onto a magnetic recording medium is supposed to be fed to an input terminal 19. The recording current control signal is multiplexed by the multiplex circuit 25, and is supplied into a demultiplex circuit 27 through a rotary transformer 26. The recording current control signal separated in the demultiplex circuit 27 is fed into recording current control circuits 10, 11, 12 and 13. The recording current control circuits 10, 11, 12 and 13 set the recording current values of the digital recording signals delivered from the demultiplex circuit 9, depending on the input recording current control signal, and record them in the magnetic recording medium 18 through magnetic heads 14, 15, 16 and 17.

Figure 3:
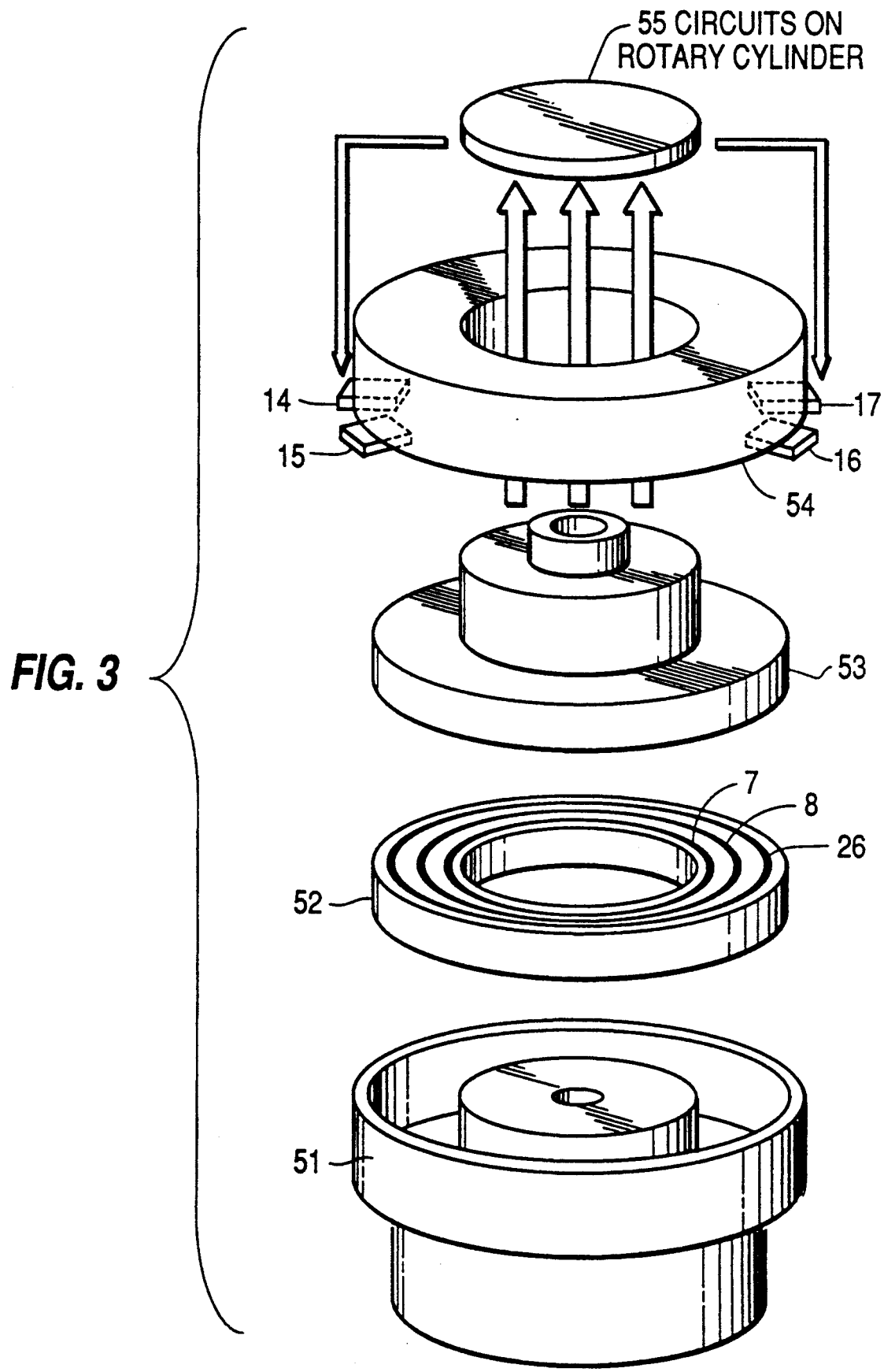
FIG. 3 is a conceptual diagram showing a constitutional example of a rotary cylinder used in the digital signal magnetic recording/reproducing apparatus shown in FIG. 1.

FIG. 3 is a conceptual diagram of a constitutional example of the rotary cylinder in the digital signal magnetic recording/reproducing apparatus shown in FIG. 1. A rotary transformer 52 of the fixed side is put on a fixed cylinder 51. A signal is transmitted from the rotary transformer 52 of the fixed side to a rotary transformer 53 of the rotary side. The transmitted signal is processed in a circuit block 55 on the rotary transformer, and is recorded through the magnetic heads 14, 15, 16 and 17. In this embodiment, signals of four channels are recorded, but rotary transformers are required only in three channels, i.e., 7, 8 and 26.

Thus, in the first embodiment, by transmitting the digital transmission signals having the input digital signals of plural channels time-division multiplexed into the rotary cylinder, the number of channels of the rotary transformer may be curtailed, and therefore it is possible to avoid an increase in size of the rotary transformer or deterioration of recording signals due to an increase of crosstalk.

Further, the recording current of the digitally transmitted signal may be adjusted by transmitting into the rotary cylinder the recording current control expressing the recording current value when recording the digital signals of plural channels on the magnetic recording medium.

In the first embodiment, the number of channels of the digital recording signals entered from the encoding/channel separating circuit 5 into the multiplex circuit 6 is set as four, and a case is considered in which the digital transmission signals which are outputs of the multiplex circuit 6 are transmitted in one channel, but the number of channels of the digital recording signals and the number of channels of the digital transmission signals may be individually selected arbitrarily. Incidentally, instead of, as stated herein, recording digital recording signals of individual channels by one head, it is also possible to record the signal of one channel using a plurality of heads. Furthermore, the method of time-division multiplexing the input digital signals of plural channels is not limited to the method shown in FIG. 2 alone, but an arbitrary procedure may be taken.

Figure 4:
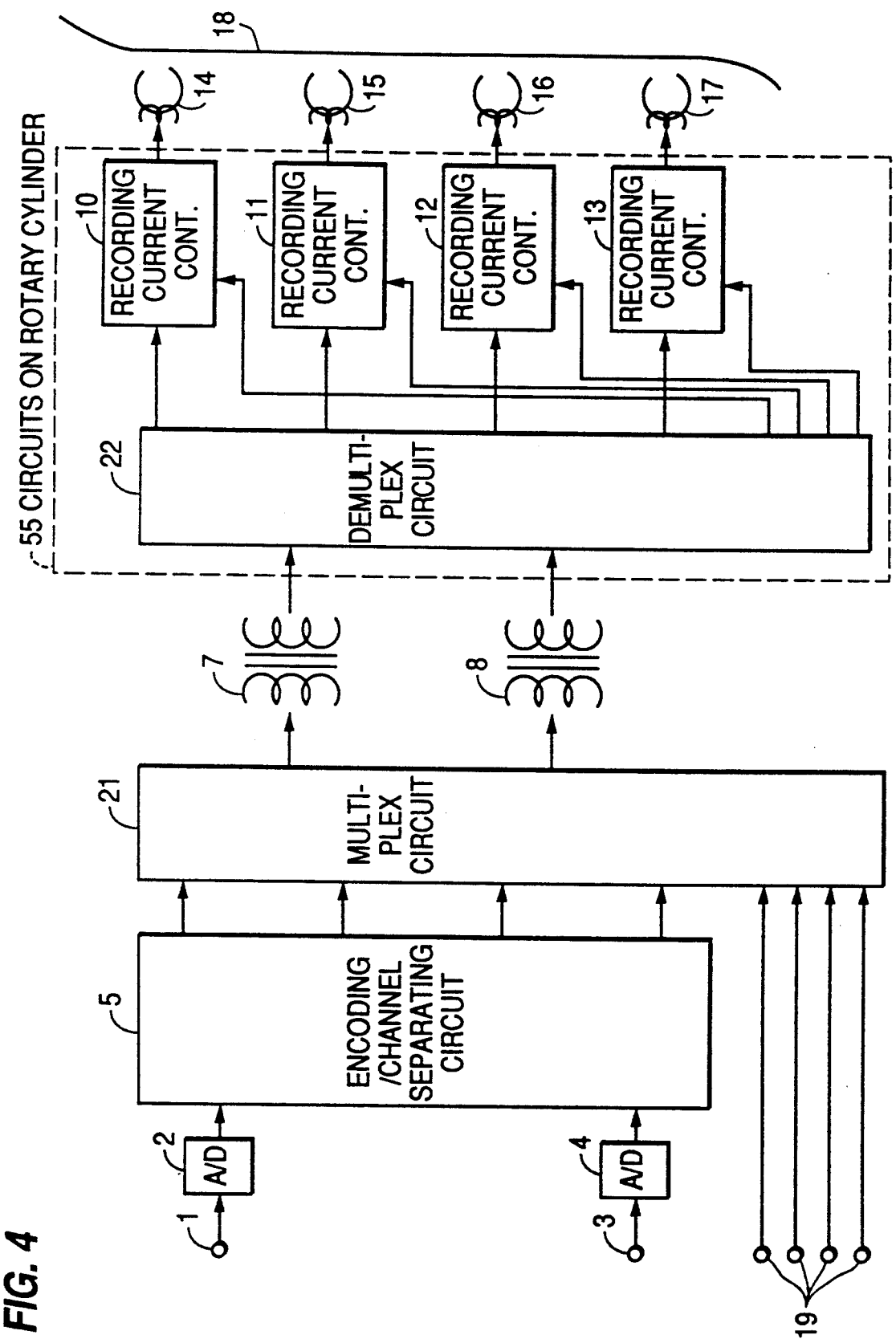
FIG. 4 is a block diagram of a digital signal magnetic recording/reproducing apparatus in a second embodiment of the invention.

FIG. 4 is a block diagram of a digital signal magnetic recording/reproducing apparatus in a second embodiment of the invention. In the second embodiment, as in the first embodiment, an analog television signal is fed in an input terminal 1, and an analog audio signal is fed in an input terminal 3, and they are A/D converted, and supplied into an encoding/channel separating circuit 5. The digital signals fed in the encoding/channel separating circuit 5 are converted into digital recording signals of plural channels, and are supplied in a multiplex circuit 21.

What differs in the second embodiment from the first embodiment is that the recording current control signal fed in the input terminal 19 is input in the multiplex circuit 21, and is time-division multiplexed together with the digital recording signals of plural channels fed in the multiplex circuit 21, and is transmitted to the demultiplex circuit 22 in the rotary cylinder through the rotary transformer 7 as a digital transmission signal. The multiplex circuit 21, as in the first embodiment, transmits the transmission clock to be used when generating the original digital recording signals of plural channels from the digital transmission signals to the demultiplex circuit 22 in the rotary cylinder through the rotary transformer 8.

The demultiplex circuit 22 separates the digital recording signals of plural lines from digital transmission signals, and separates simultaneously the recording current control signals and feeds into the recording current control circuits 10, 11, 12 and 13. The recording current control circuits 10, 11, 12 and 13 set the recording current values of the digital recording signals delivered from the demultiplex circuit 22, depending on the input recording current control signals, and record them in the magnetic recording medium 18 through magnetic heads 14, 15, 16 and 17.

In the multiplex circuit 21, for multiplexing the recording current control signal, for example, in the technique as shown in FIG. 2, the recording current control signal may be regarded as one channel of the recording signal. Or it is also possible to time-base compress the digital recording signal and multiplex the recording current control signal in a vacant portion.

Thus, in the second embodiment, the digital transmission signals having the recording current control signal time-division multiplexed are transmitted, together with input digital signals of plural channels, into the rotary cylinder, and therefore the number of channels of the rotary transformer is curtailed, so that it is possible to avoid an increase in size of the rotary transformer and deterioration of recording signals due to an increase of crosstalk.

As shown in the second embodiment, by multiplexing the recording current control signal, the number of channels of the rotary transformer can be reduced, but the bandwidth of the digital transmission signal becomes broader than necessary. Further extra hardware is needed for time-base compressing. These points further improved in a third embodiment, of which concept is shown in FIG. 5.

Figure 5A:
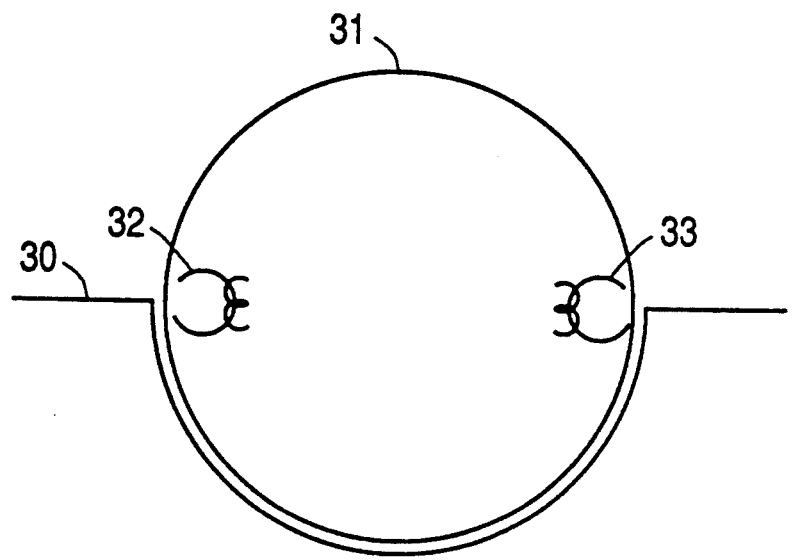
FIG. 5(a) is a conceptual diagram showing the configuration of a magnetic head 32, a magnetic head 33 and a magnetic recording medium 30 of a digital signal magnetic recording/reproducing apparatus in a third embodiment of the invention.
Figure 5B:
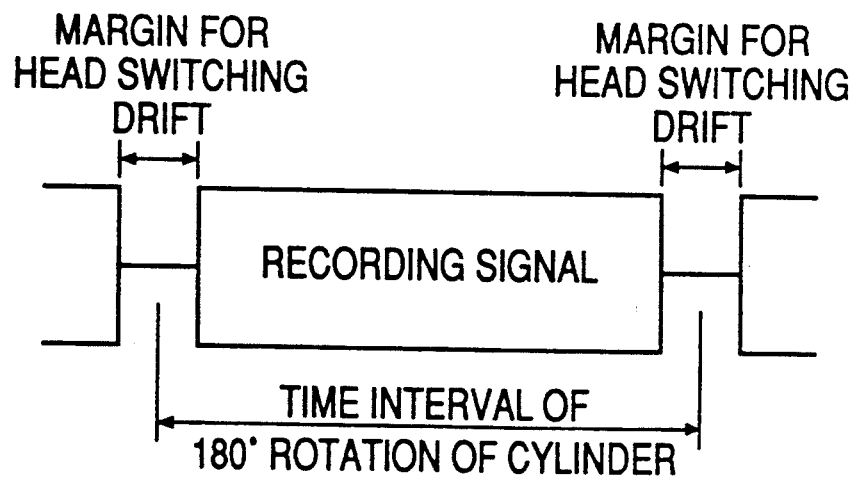
FIG. 5(b) is a conceptual diagram showing an example of the waveform of a recording signal including a switching allowance of the digital signal magnetic recording/reproducing apparatus in the third embodiment of the invention.

In FIG. 5(a), it is supposed that the recording signals of one channel are recorded in a magnetic recording medium 30, by means of two magnetic heads 32 and 33 on a rotary cylinder 31. At this time, ideally, digital recording signals of one channel are continuously recorded on the magnetic recording medium 30 by either one of the heads, but in the actual apparatus, a no-signal portion is provided in the recording signal in order to have an allowance when changing over the magnetic head to be used. This no-signal portion is known as the switching allowance. The recording signal waveform is shown in FIG. 5(b). This switching allowance portion must be free from recording signal, but in the stage of transmitting the rotary transformer, it does not matter if there is any signal. By multiplexing recording current control signals in this portion, it is possible to decrease the number of channels of the rotary transformer, without causing an unnecessary expansion of the bandwidth of digital transmission signals, or an increase of hardware for time-base compression.

FIG. 6 shows a fourth embodiment for multiplexing the recording current control signal without having to unnecessarily expand the band of the digital transmission signal or provide extra hardware for time-base compression.

Figure 6A:
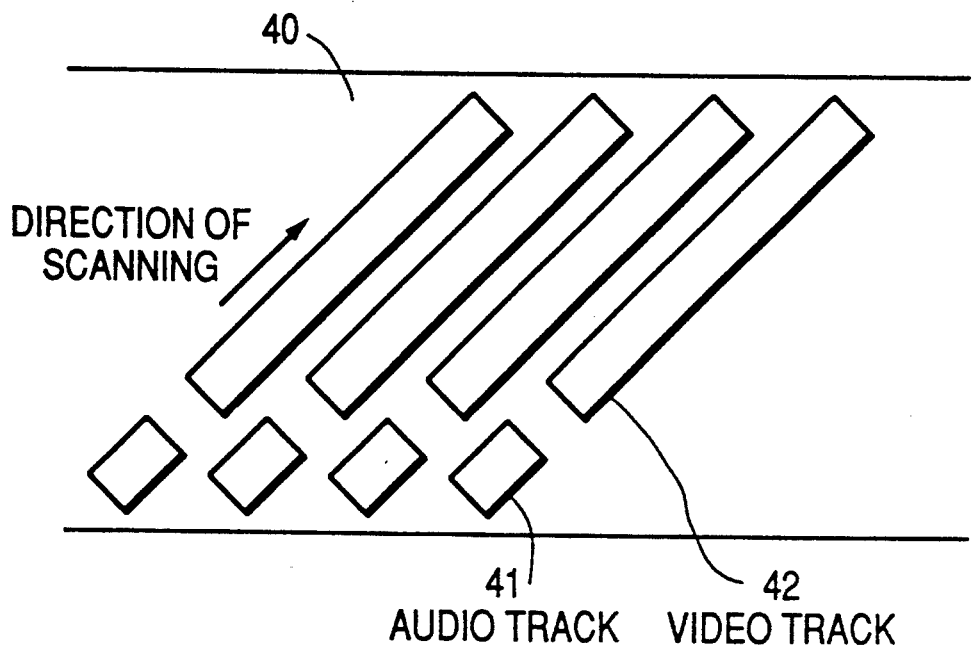
FIG. 6(a) is a conceptual diagram showing the configuration of a video signal track 42 and an audio signal track 41 of a digital signal magnetic recording/reproducing apparatus in a fourth embodiment of the invention.
Figure 6B:
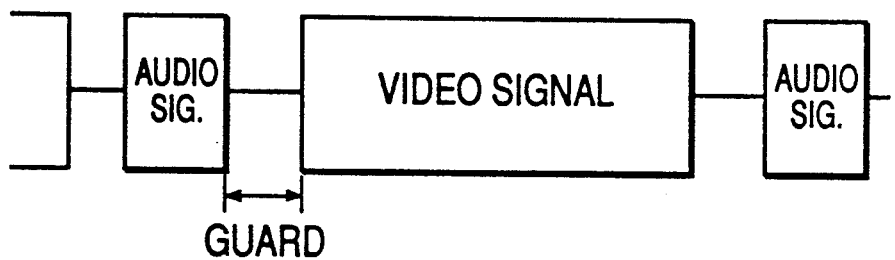
FIG. 6(b) is a conceptual diagram showing an example of the waveform of a recording signal including the guard for sound editing of the digital signal magnetic recording/reproducing apparatus in the fourth embodiment of the invention.

As in the first embodiment shown in FIG. 1 or the second embodiment in FIG. 4, in the digital signal magnetic recording/reproducing apparatus receiving video signals and audio signals, it is required to perform editing work of video signals and editing work of audio signals separately. Accordingly, for example as shown in FIG. 6(a), a video signal track 42 for recording video signals and an audio signal track 41 for recording audio signals may be formed separately. At this time, as the allowance for editing, a no-signal portion is provided between audio signal and video signal. This no-signal portion is called a guard. The recording signal waveform in this case is shown in FIG. 6(b). This guard portion should be free from recording signal, but in the stage of transmitting the rotary transformer, it does not matter if any signal is present. By multiplexing recording current control signals in this portion, the number of channels in the rotary transformer may be curtailed without accompanying un-necessary expansion of the bandwidth of digital transmission signals or increase of hardware for time-base compression.

Thus, in the third and fourth embodiments, the digital transmission signals having the recording current control signals time-division multiplexed are so designed as to be transmitted into the rotary cylinder together with input digital signals of plural channels. Therefore, the number of channels of the rotary transformer is saved, and an increase in size of the rotary transformer or deterioration of recording signals due to an increase of crosstalk may be avoided, while the recording current of digitally transmitted signals may be adjusted. Furthermore, in spite of these improvements mentioned above, unnecessary expansion of the bandwidth of digital transmission signal, and increase of hardware for time-base compression may be avoided.

In the first to fourth embodiments, inputs of television signals and audio signals are mentioned, but similar effects may be obtained in the case of inputs of other signals such as digital data of a computer.

What is claimed is:

1. A digital signal magnetic recording apparatus comprising:
    means for encoding and separation an input digital signal to obtain digital signals of plural channels;
    multiplex means for time-division multiplexing the digital signals of plural channels to obtain a digital transmission signal;
    first transmitting means for transmitting the digital transmission signal to a rotary cylinder;
    demultiplex means provided on the rotary cylinder for obtaining the digital signals of plural channels from the digital transmission signal transmitted through the first transmitting means; and
    a plurality of magnetic heads provided on the rotary cylinder for recording the digital signals of plural channels from the demultiplex means on a magnetic recording medium.

2. An apparatus of claim 1, which further comprises second transmitting means for transmitting to the rotary cylinder a recording current control signal expressing values of recording currents used for recording the digital signals of plural channels on the magnetic recording medium, and a plurality of recording current control means provided on the rotary cylinder for controlling quantities of the recording currents for the digital signals of plural channels according to the recording current control signal transmitted through the second transmitting means.

3. A digital magnetic recording apparatus comprising:
    multiplex means for time-division multiplexing input digital signals of plural channels and a recording current control signal expressing values of recording currents used for recording the digital signals of plural channels on a magnetic recording medium to obtain a digital transmission signal;
    transmitting means for transmitting the digital transmission signal to a rotary cylinder;
    demultiplex means provided on the rotary cylinder for obtaining the digital signals of plural channels and the recording current control signal form the digital transmission signal transmitted through the transmitting means;
    a plurality of magnetic heads provided on the rotary cylinder for recording the digital signals of plural channels from the demultiplex means on the magnetic recording medium; and
    a plurality of recording current control means for controlling the recording currents used for recording the digital signals of plural channels according to the recording current control signal from the demultiplex means.

* * * * *